July 29, 1958
G. E. GROENER ET AL
2,845,525
WELDING EQUIPMENT
Filed Oct. 31, 1956
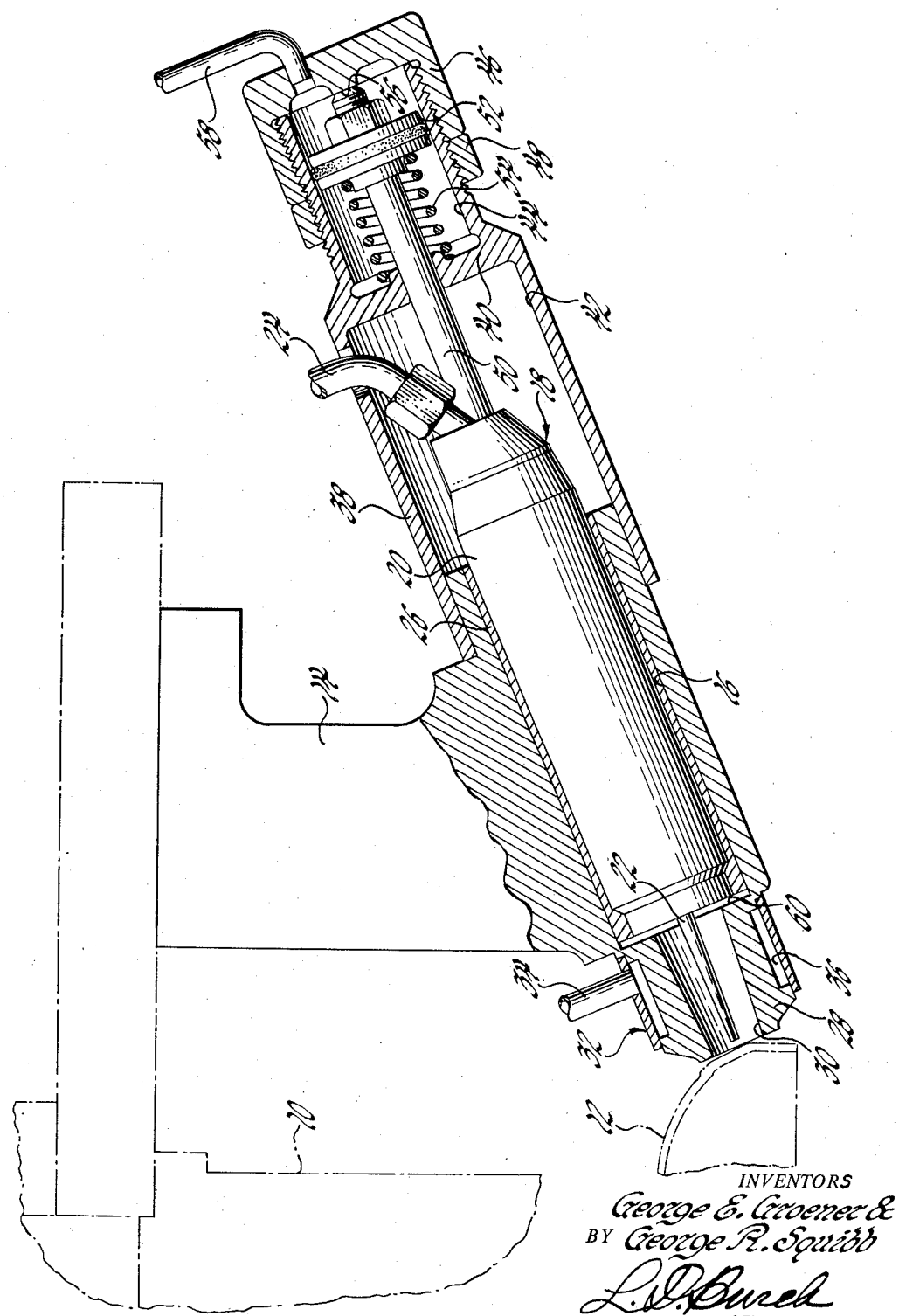
INVENTORS
George E. Groener &
BY George R. Squibb
ATTORNEY

United States Patent Office 2,845,525
Patented July 29, 1958

2,845,525

WELDING EQUIPMENT

George E. Groener, Pontiac, and George R. Squibb, Birmingham, Mich., assignors to General Motors Corporation, Detroit, Mich., a corporation of Delaware Application October 31, 1956, Serial No. 619,439

7 Claims. (Cl. 219—130)

This invention relates to welding equipment generally and more particularly to means for obtaining the proper weld gap between an electrode and its workpiece.

The standard type of nonconsumable electrode welding gun is one in which the electrode does not supply the weld metal but rather provides a medium for directing a high intensity heat, in the form of a high current arc, to induce fusion. This type of electrode is subject to oxidation and contamination at its tip which causes the electrode to break down and requires periodic readjustment of the distance between the electrode tip and its work.

The presently available means of resetting an electrode tip to provide the proper welding gap includes means for adjusting the welding electrode within the gun. This requires individual attention to each gun. In highly productive welding machines such an adjustment may be required as often as every ten minutes. The more welding guns there are on such machines the more impractical becomes the separate adjustment of each individual electrode to provide the correct welding gaps.

It is here proposed to provide automatic means for adjusting the welding gap of a nonconsumable electrode welding gun which may be used on all the guns of a machine or group of machines for re-establishing an optimum welding gap following an electrode break down. The proposed means includes having the welding gun mounted in an air cylinder fixture in a manner permitting the whole gun to be advanced and retracted relative to fixed stops provided by the fixture. In this arrangement the electrode may be advanced to engage the work when the gun is fully advanced and then when the gun is retracted the electrode is drawn back from the work with the gun the distance required to provide the best possible welding gap. Having the welding gun mounted in an air cylinder permits air pressure actuation and, consequently, is equally adapted to single or gang groups of welding guns.

In the drawing is shown a nonconsumable electrode welding gun as mounted in the proposed gap setting fixture.

Only a fragmentary part of the welding machine 10 and the work member 12 are shown in the drawing. A hanging bracket 14 including a cylindrical bore 16 is adapted to receive the welding gun 18 therein.

The welding gun 18 is a standard type nonconsumable electrode gun shown to include a gun casing 20 and electrode tip 22. The gas, electrical and other connections normally made to the gun are not shown since they form no part of this invention. The gun does include means for advancing the welding tip, the only part of which here shown in the air pressure conduit 24 connected to the after end of the gun casing. Welding guns including this feature are such, for example, as are made commercially available by the Linde Air Products Company.

The welding gun casing 20 is disposed within a sleeve member 26 relatively movable within the bore 16. The end of the fixture is necked down as at 28 with an access 30 provided for the electrode 22. Coolant means 32 are provided about the end 28 of the fixture and include the conduit 34 and annular passage 36.

A cylindrical sleeve 38 is secured to the end of the fixture or bracket 14 and includes a dividing wall 40 separating the sleeve into two chambers 42 and 44. An adjustable cap 46 is threaded on the end of the sleeve with a lock nut 48 for holding the selected cap position. A piston rod 50 secured to the end of the welding gun case 20 extends through wall 40 and includes a piston head member 52 within the chamber 44. A compression spring 54 biases the piston head towards the closing cap 46 and the end of rod 50 against a stop 56 formed within the cap.

An air pressure inlet conduit 58 is connected through cap 46 to chamber 44 and upon the application of air pressure into the chamber and against piston 52 moves the welding gun 18, against the biasing force of spring 54, until engaged against the stop formed by the shoulder 60 at the end of the cylindrical bore 16.

In operation, the cap 46 is adjusted to position the end of gun 18 relative to the stop shoulder 60 a distance equal to the required gap between the tip of the electrode 22 and the workpiece 12. After a period of operation or following an electrode break down, air pressure is introduced into chamber 44 and against piston 52 to move the gun against the end stop 60. Air pressure is then applied to the electrode advancing means within the gun to move the electrode against the workpiece. On cutting off the air pressure to the electrode and chamber 44, the spring 54 retracts the gun until the end of rod 50 engages the stop 56; thereby repositioning the electrode for the proper welding gap.

We claim:

1. The method of adjusting the nonconsumable electrode of a welding gun to obtain the proper weld gap which includes, advancing said gun and electrode together a predetermined distance toward a workpiece, advancing said electrode independently of said gun to engage said workpiece, and retracting said gun and electrode together a distance equal to the required weld gap.

2. The method of adjusting the nonconsumable electrode of a welding gun to obtain the proper weld gap between a workpiece and the electrode member which includes, advancing said welding gun and electrode together towards said workpiece, stopping said welding gun and advancing said electrode to engage said workpiece, and retracting said welding gun and electrode together a distance equal to the required weld gap.

3. The method of adjusting the nonconsumable electrode of a welding gun mounted for operation to obtain the proper welding gap between said electrode and a workpiece which includes, advancing said welding gun and electrode together a distance equal to the required weld gap, stopping said welding gun and advancing said electrode independently to engage said workpiece, and retracting said welding gun and electrode together to the original position of said gun for spacing said electrode from said workpiece the required distance.

4. Welding gap setting means for use with a welding device having a nonconsumable and adjustable electrode, said means including a support for receiving said welding device for axial movement normal to a given workpiece, means engaging said welding device for advancing said welding device with its electrode toward said workpiece an amount equal to the required welding gap and holding said gun in such position during the independent advancement of said electrode to engage said workpiece, and means acting between said support and said welding device for retracting said device with said electrode to the initial position of said device for spacing said electrode the required distance from said workpiece.

5. Welding gap setting means for use with a welding gun having an adjustable and nonconsumable electrode, said means including a support for receiving said welding gun for axial movement normal to a given workpiece, means for advancing said gun and said electrode together towards said workpiece, means provided upon said support for limiting the forward travel of said gun and allowing the adjustment of said electrode to engage said workpiece, means for retracting said gun and said adjusted electrode, and stop means provided upon said support for limiting the retraction of said gun and said electrode to a distance equal to the spacing required between said electrode and said workpiece.

6. Welding gap setting means for use with a welding device including an adjustable and nonconsumable electrode, said means including a support fixture having a bore formed therein for receiving said welding device for axial movement normal to a given workpiece, air cylinder means secured to one end of said support fixture and including a piston member for engaging said welding device, air pressure means received within said cylinder and on one side of said piston for advancing said welding device and its electrode towards said workpiece, a limit stop provided at the forward end of said support fixture for stopping said welding device and permitting the continued advance of said electrode to engage said workpiece, a spring member engaged between said support and said piston member for biasing said welding device in a retracted position relative to said workpiece, and an adjustable stop closing one end of said air cylinder and limiting the retraction by said spring of said welding device and its advanced electrode to a distance equal to the required weld gap spacing of said electrode relative to said workpiece.

7. A welding device including in combination a welding gun having a nonconsumable and adjustable electrode and a support fixture for use therewith, said fixture being formed to provide a bore having said welding gun received therein for axial movement normal to a given workpiece, an air cylinder member secured to said fixture and including a piston member engaged to said welding gun, an adjustable closure member received upon one end of said cylinder member, biasing means for urging said piston against said closure member and said welding gun in a retracted position relative to said workpiece, air pressure means in communication with said air cylinder for advancing said welding gun and its electrode by means of said piston member and against said biasing means towards said workpiece, a fixed stop provided at the end of said fixture adjacent said workpiece for limiting the advance of said welding device, and means advancing said electrode to engage said workpiece while said welding gun is engaged with said stop, said biasing means returning said welding gun and said advanced electrode to the limit provided by said closure cap upon the release of said air pressure means for spacing said electrode the required welding gap distance from said workpiece.

References Cited in the file of this patent

UNITED STATES PATENTS

| | | |
|---|---|---|
| 2,586,140 | Anderson | Feb. 19, 1952 |
| 2,636,967 | Bassot et al. | Apr. 28, 1953 |
| 2,761,956 | Potter et al. | Sept. 4, 1956 |